(12) United States Patent
Casiana

(10) Patent No.: US 8,109,238 B2
(45) Date of Patent: Feb. 7, 2012

(54) LITTER BOX INTERFACE JUNCTION COVER

(76) Inventor: Thomas A Casiana, Winneconne, WI (US)

( * ) Notice: Subject to any disclaimer, the term of this patent is extended or adjusted under 35 U.S.C. 154(b) by 347 days.

(21) Appl. No.: 12/437,597

(22) Filed: May 8, 2009

(65) Prior Publication Data
US 2009/0288610 A1 Nov. 26, 2009

Related U.S. Application Data

(60) Provisional application No. 61/056,035, filed on May 26, 2008.

(51) Int. Cl.
*A01K 29/00* (2006.01)

(52) U.S. Cl. .................................. 119/166; 119/161

(58) Field of Classification Search ............ 119/161, 119/165, 166, 168; 428/343, 40.1, 98, 156, 428/192, 352, 354, 77, 41.8; *A01K 29/00, A01K 1/00*
See application file for complete search history.

(56) References Cited

U.S. PATENT DOCUMENTS

| | | | |
|---|---|---|---|
| 3,917,333 A * | 11/1975 | Grattan | 294/1.3 |
| 5,048,465 A | 9/1991 | Carlisi | |
| 6,298,808 B1 | 10/2001 | Crafton | |
| 6,378,461 B1 | 4/2002 | Thaler | |
| 6,461,715 B1 * | 10/2002 | Guenther et al. | 428/131 |
| 6,848,394 B1 | 2/2005 | Sexton | |
| 6,851,386 B2 | 2/2005 | Northrop | |
| 6,941,894 B2 * | 9/2005 | Scotto D'Anielo | 119/166 |
| 6,951,190 B2 | 10/2005 | Northrop | |
| 7,051,678 B2 | 5/2006 | Strickland | |
| 2003/0217700 A1 | 11/2003 | Northrop | |

* cited by examiner

*Primary Examiner* — Kimberly Berona
*Assistant Examiner* — Kathleen Iwasaki
(74) *Attorney, Agent, or Firm* — Steven H. Greenfield; Greenfield Invention and Patent Consulting, Inc.

(57) ABSTRACT

The present invention relates to a device for facilitating and maintaining the cleanliness of a self cleaning cat litter box. The device is a structure that contains two plastic strips attached to a tape and attaches to an interface junction located at the top of a litter box container ramp. The device facilitates and guides the waste as it is moved from the litter box into a waste receptacle insert by rake tines and prevents contamination of areas along the path of the moving waste.

12 Claims, 9 Drawing Sheets

LITTER BOX INTERFACE JUNCTION COVER

This application claims priority from provisional application No. 61/056,035 filed on May 26, 2008.

FIELD OF THE INVENTION

The present invention relates to a device for facilitating and maintaining the cleanliness of a self cleaning cat litter box. The device comprises a structure that contains two plastic strips attached to a tape. The device covers an interface junction of the litter box and prevents accumulation of waste and contamination along and underneath this junction. Flexible hinging allows easy removal and replacement of modified plastic waste receptacles. The system greatly simplifies periodic pet owner litter management, is ecologically friendly, and reduces the wasteful disposal of costly plastic receptacles.

BACKGROUND OF THE INVENTION

Litter boxes are common devices used for the collection and easy disposal of cat waste. The litter used in the litter boxes is commonly comprised of a granulated material that clumps within a short time period after a cat excretes into it. The owner can then scoop up these clumps and safely dispose of them. Self cleaning litter boxes are designed to automatically move the waste from the litter box into a waste receptacle. One system and mechanism for moving the clumps involves a motor driven rake made of a plurality of rake tines that, upon activation, sift through the litter pan to carry or push the litter clumps upward along an inclined ramp from where they fall into the receptacle. After the litter clumps have been deposited inside the waste receptacle, the motor stops and reverses direction to return the rake to the back of the litter box. Some litter box models are equipped with sensors that detect a cat's presence in the litter box and activate the rake motor as soon as the cat leaves the box. Litter granules are typically maintained at a depth of at least 1-2 inches. The main ingredient in the litter granules is sodium bentonite which is a special type of clay that uses the moisture it absorbs to bond soiled litter particles into clumps for easy removal and disposal. Odor containing chemicals are also often incorporated into the litter. Other clumping litters are made of organic products like corn, pine and wheat.

The waste collection system for Littermaid® litter boxes, a known brand currently on the market, comprises a litter box container that contains the litter, a rake that moves the waste toward the waste receptacle, a ramp leading to the waste receptacle, a short interface junction that bridges between the top of the ramp to the top of the waste receptacle, and the waste receptacle itself. In the Littermaid® unit, the waste receptacle is attached to the interface junction and accumulates waste. When filled, the waste receptacle needs to be removed and the waste discarded. Removing the receptacle as designed is time consuming, cumbersome and requires contact with waste material. One solution to this problem found in the prior art is the use of inserts or disposable liners that receive the waste moved by the rakes from the litter pan. The inserts are reusable and can easily be removed, emptied and replaced. After a period of use, the inserts are disposed of and replaced with new ones.

The prior art references describe various automatic and self cleaning litter box features, embodiments and methods for cleaning the litter boxes. For example, some automatic litter box waste receptacles disclosed in the art are equipped with lids designed to open as the rake approaches the top of the litter pan and close as the rake retreats. In another reference, a box within a box device is utilized to change litter without having to touch or manipulate the soiled litter. Waste receptacle inserts are also referred to in several of these references. U.S. Pat. No. 5,048,465 discloses a self-cleaning kitty litter box and method for cleaning the litter box. The kitty litter box has a removable pan in which kitty litter is placed. A motor and timing device are provided for periodically moving a rake through the kitty litter so to push solid waste to one end of the pan. The rake is then rotated in contact with a stop out of the pan and the rake then moves forward and drops the collected solid waste into a storage tray. The motor and timer allow this process to be periodically repeated without involvement of the cat owner until ultimate disposal of the cat waste is desired. U.S. Pat. No. 6,848,394 describes a cat litter box which will allow cat owners to change litter without having to touch or manipulate the soiled litter. The device consists of a box within a box. The inside box is made with swinging trap doors on the bottom of the interior part of a shell of the device. This allows the cat litter to flow freely from the interior shell to the bottom half of the exterior shell. U.S. Pat. No. 6,851,386 is directed to a waste box for use with a litter box where the waste box is used for collecting litter clumps removed from the litter box and for collecting litter particulate scattered onto the waste box after a cat exists the litter box. U.S. Pat. No. 6,951,190 discloses a self-cleaning litter box having a base, a litter pan, an upper hood and a lower hood. A rake is used to sweep litter clumps disposed in the litter pan and into a waste box. The rake is inserted and removed without the use of tools in order to clean or replace the rake. Liners inside the litter pan and waste box allow for easy cleaning. Sensors detect the presence of a cat inside the litter pan. Upon exit, an actuator receives an output signal for actuating the drive assembly. After a predetermined time delay after receipt of the output signal, the raking cycle commences. U.S. Pat. No. 6,298,808 teaches a plurality of modules to guard the privacy of the cat. The privacy system includes a stackable module, including a frame, a cantilevered platform with a first end attached to the frame and a second free end that extends away from the frame and/or a fastener to attach the modules to one another. Each module includes an opening to allow for access by a cat into the interior of the module. The modules may be stacked one on top of the other and then fastened together in a manner that prevents vertical motion between the modules. U.S. Pat. No. 6,378,461 relates to a self-cleaning litter box for cats that employs a comb drive to drive a comb through litter to remove waste from the litter. A sensor for detecting the presence of an obstruction is coupled to the comb drive and stops the comb drive upon detecting an obstruction. A removable tray for cat litter may be provided. The tray may be disposable. A pivotable ramp facilitates ingress to, and egress from, the litter box. The ramp may be carpeted. A tray receives the litter box and a hood encloses the litter box to provide privacy. U.S. Pat. No. 7,051,678 is for an enclosed litter box having a slidably removable litter tray and an integral rake. The litter box includes an enclosure with an arched top having a compound curved surface. The exterior of the enclosure may be decorated with various motifs.

Problems in the Littermaid® style self cleaning litter box and similar systems not addressed in the prior art or in the self cleaning litter boxes currently on the market are 1) the tendency for waste build-up at the interface junction along the top of the ramp and the waste receptacle, 2) the tendency for waste to fall in the gap between the waste receptacle and the disposable insert, 3) maintenance and handling of receptacles in the proximity of soiled litter and waste and 4) costly and careless disposal of plastic waste receptacles.

SUMMARY OF THE PRESENT INVENTION

In one aspect of the present invention, a strip assembly comprises: a tape having an adhesive side, a release side, an incline section, a flat section and a discharge section; a first strip member having a top side and a bottom side, said top side of the first strip member being attached to the flat section adhesive side of the tape; and a second strip member, said second strip member being attached to the discharge section adhesive side of said tape in a manner that a portion of the second strip member protrudes outside the discharge section of the tape.

In another aspect of the present assembly, a system for covering an interface junction in a litter box comprises: a litter box container having a back wall, a front wall and two side walls, said front wall forming a ramp having a top and a bottom, said container containing cat litter; an interface junction attached to the top of the ramp; a waste receptacle box attached to the interface junction; a rake assembly attached to the side walls, said rake assembly containing a plurality of rake tines, said rake assembly being adapted for moving along the side walls and sweeping through the litter to move litter clumps from the back wall of the litter box up the ramp and over the interface junction into the waste receptacle box; a waste receptacle insert disposed inside the waste receptacle box; the strip assembly of claim 1, said incline section of the tape being attached to the top of the ramp of the cat litter box container, the bottom side of the first strip member being disposed on the interface junction, and said discharge section being bent into the waste receptacle at a bending angle relative to the flat section.

These and other features, aspects and advantages of the present invention will become better understood with reference to the following drawings, descriptions and claims.

DETAILED DESCRIPTION OF THE INVENTION

The present invention relates to a strip assembly designed to cover and bridge over the interface junction between the litter box ramp and a waste receptacle insert placed inside the waste receptacle box. The structure prevents contaminated waste from falling into the gap between the waste receptacle and the receptacle insert and reduces waste build-up at the interface junction. The structure reduces costly and wasteful receptacle disposals, simplifies daily litter handling, eliminates the tedious removal and replacement of waste receptacles, helps odor control and requires less contact and proximity with soiled waste materials.

The litter boxes that can utilize the strip assembly, such as the Littermaid® brand litter boxes, comprise a litter box container that contains cat litter, a rake assembly for moving the cat excretion waste clumps from the back of the container to the front where the container slopes upward forming a ramp. The ramp leads into a short horizontal and flat interface junction which in turns leads to the waste receptacle. From the junction, the waste clumps fall into the waste receptacle. This type of litter box is equipped with a motor and drive for moving the rake, and a timing system for adjusting the rake activation time interval. Litter boxes that have unique features described in the prior art references can also accommodate the present invention. These features include but are not limited to litter pan liners, hoods for exhausting the odor, and sensors that cease the motion of the rake upon detecting the presence of a cat. A waste receptacle insert may be placed inside the waste receptacle. The waste receptacle and insert may be made of a variety of materials including plastic, paper, fabric or combinations thereof. The strip assembly may be used in the Littermaid® brand litter boxes and in other litter boxes that have a similar design.

The strip assembly may be composed of a tape having an adhesive side and a side that is generally releasing. The tape may be made of a coated cloth, duct tape, synthetic fiber, vinyl, paper, metal and combinations thereof, but other materials also fall within the scope of the present invention. Two plastic strips are attached to the adhesive side of the tape which, when combined with the tape, comprise the strip assembly. The adhesive side of the strip assembly may be placed on the interface junction in a manner that a portion of the strip assembly bends into the waste receptacle insert at an angle of between about 25 degrees to about 65 degrees relative to the interface junction and preferably about 45 degrees. In order to achieve this positioning, the tension forces in the strip assembly and the gravity forces acting on it must be well balanced. This balancing is accomplished by using the proper weights and dimensions for the strip assembly components. Achieving a bending angle is important so that waste transported by the rake tines up the ramp and on the interface junction is able to continually clear the junction and fall into the waste receptacle insert. The components and the dimension specifications for the structure are as follows:

The tape has three sections: an incline section, a flat section, and a discharge section. The length of the incline section and the length of the flat section are each about 13.25 inches. The width of the incline section is about 0.625 inches, and the width of the flat section is about 0.375 inches. The length of the discharge section is about 12.5 inches, which is about 0.75 inches shorter than the lengths of the incline and flat sections, or a reduction of about 0.375 inches from each side. The width of the discharge section is 0.875 inches. Thus the total width of the tape which includes the widths of the incline section, the flat section, and the discharge section, is about 1.875 inches.

A first strip member has a length dimension of about 13.25 inches and a width dimension of about 0.375 inches. The first strip member is attached to the flat section adhesive side of the tape. A second strip member has a length dimension of about 12.5 inches and a width of about 1.25 inches. The second strip member is attached to the discharge section adhesive side at a distance of about 0.125 inches from the first strip member. The result is that about 0.75 inches of the end of the tape incline section is covered by the second strip member leaving about 0.5 inches of the second strip member unattached to the tape and protruding outside the discharge section of the tape.

The thickness of the tape may range from about 0.007" to about 0.015" while the thickness of the first strip member and second strip member may range from about 0.015" to about 0.02".

The preferred material of construction of the first and second strip members is styrene. However, other plastic materials including but not limited to polypropylene, nylon, polyethylene, vinyl, polycarbonate, and Lexan® are within the scope of the present invention.

The adhesive side of the tape incline section is attached to the upper end of the litter box ramp. The first strip member and the tape flat section cover the interface junction with the first strip member placed against the interface junction. The discharge section and the second strip member attached to it cover the gap between the waste receptacle and the waste receptacle insert and bend down into the waste receptacle insert. The dimensions of the strip assembly structure and the choice of materials are critical to its proper function and allow for little tolerance. The materials, shape and weight provide it with sufficient flexibility to hinge downward when the clumps are passing through and direct the waste into the waste receptacle insert but recover to its original shape when the waste clumps no longer weigh on the strip assembly. Specifically, the weight of the second plastic strip causes the structure to bend down at between about 25 degrees to about 65 degrees relative to the flat section of the tape into the waste receptacle insert at the 0.125 inch gap between the first and second plastic strips. This gap acts as a hinge for bending the discharge section into the waste receptacle insert. The strip assembly can easily be removed at the end of its useful life, and a new one installed. The release surface helps the waste slide off the discharge section and fall into the waste receptacle insert.

Figure 1:
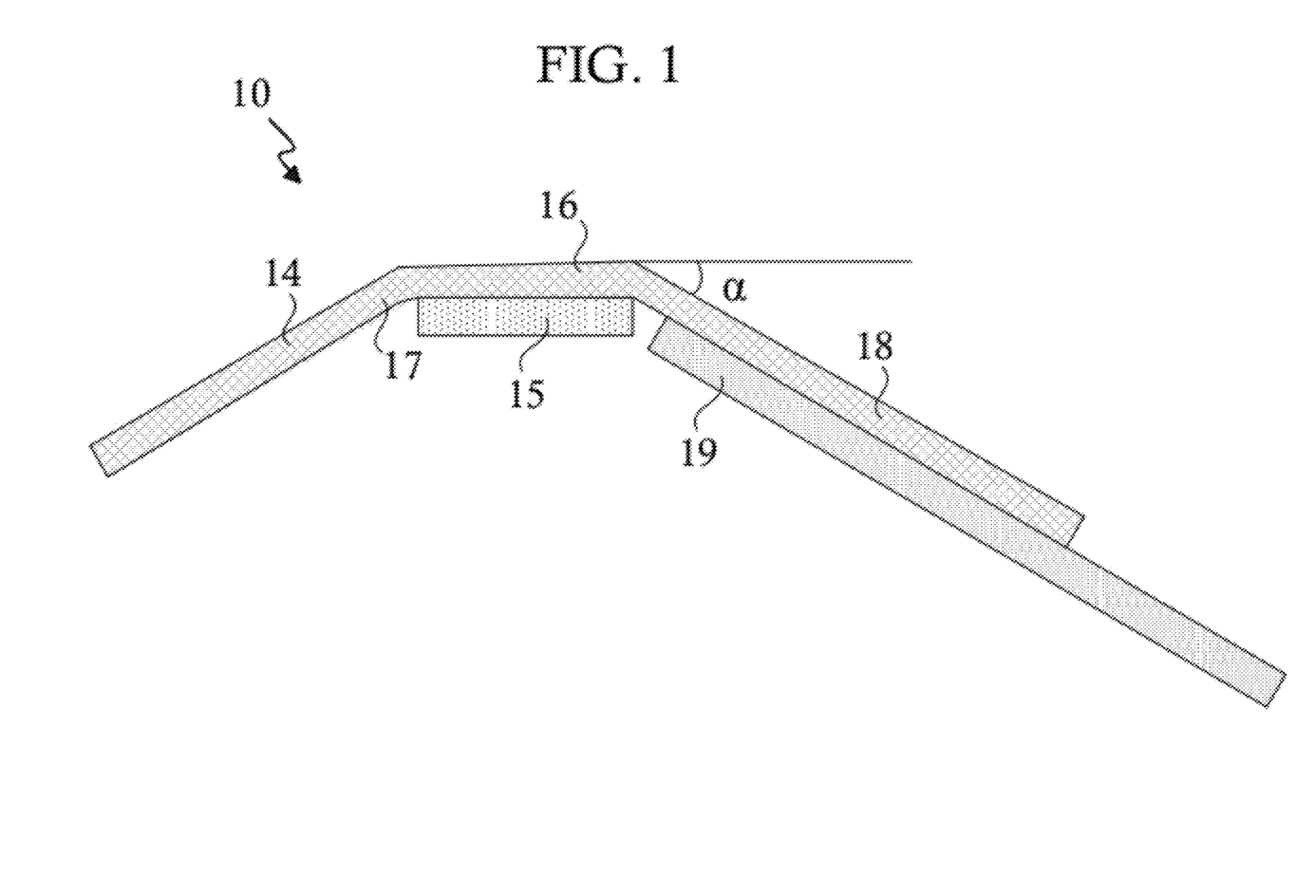
FIG. 1 is a side view schematic of the strip assembly according to an embodiment of the present invention.
Figure 2:
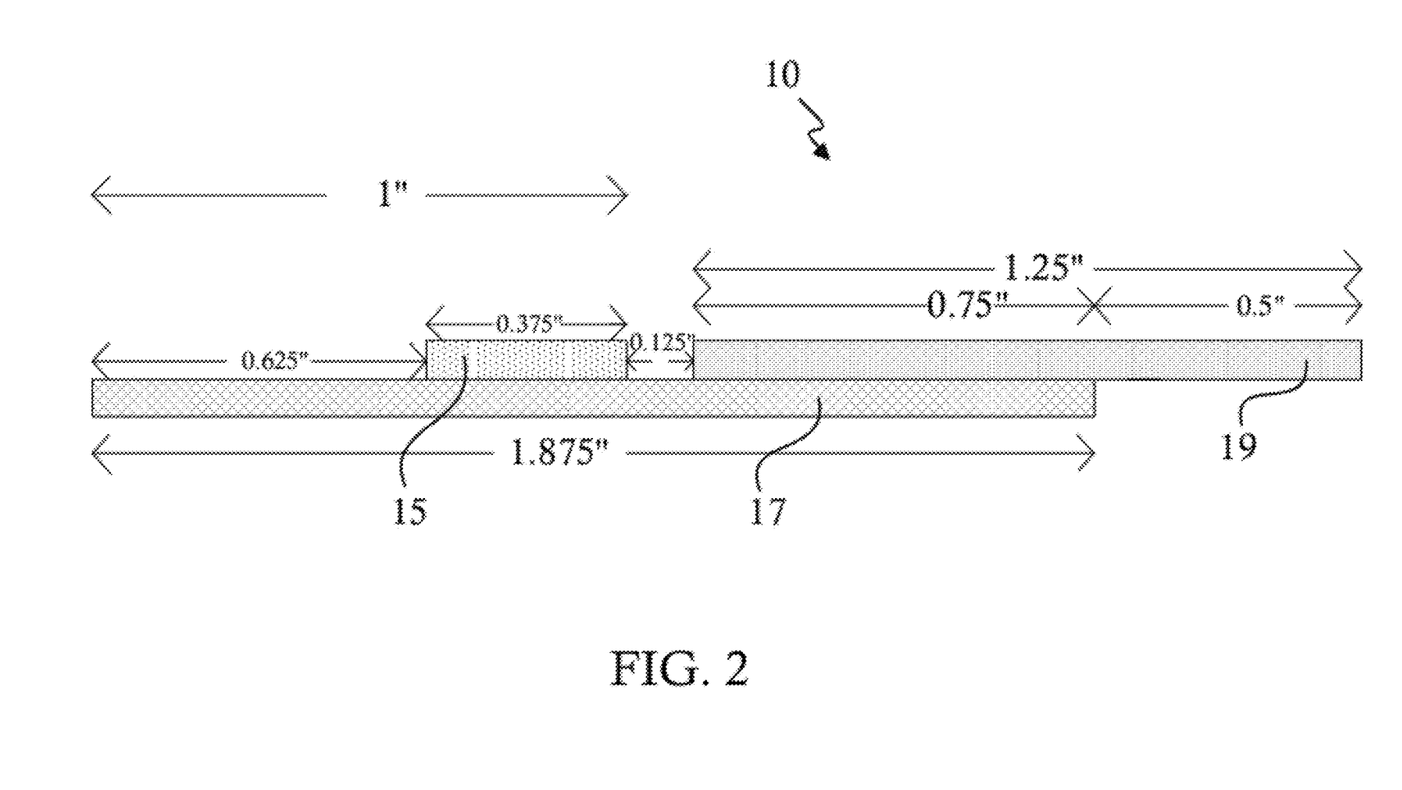
FIG. 2 is a side view schematic of the strip assembly showing the preferred dimensions according to an embodiment of the present invention.
Figure 3:
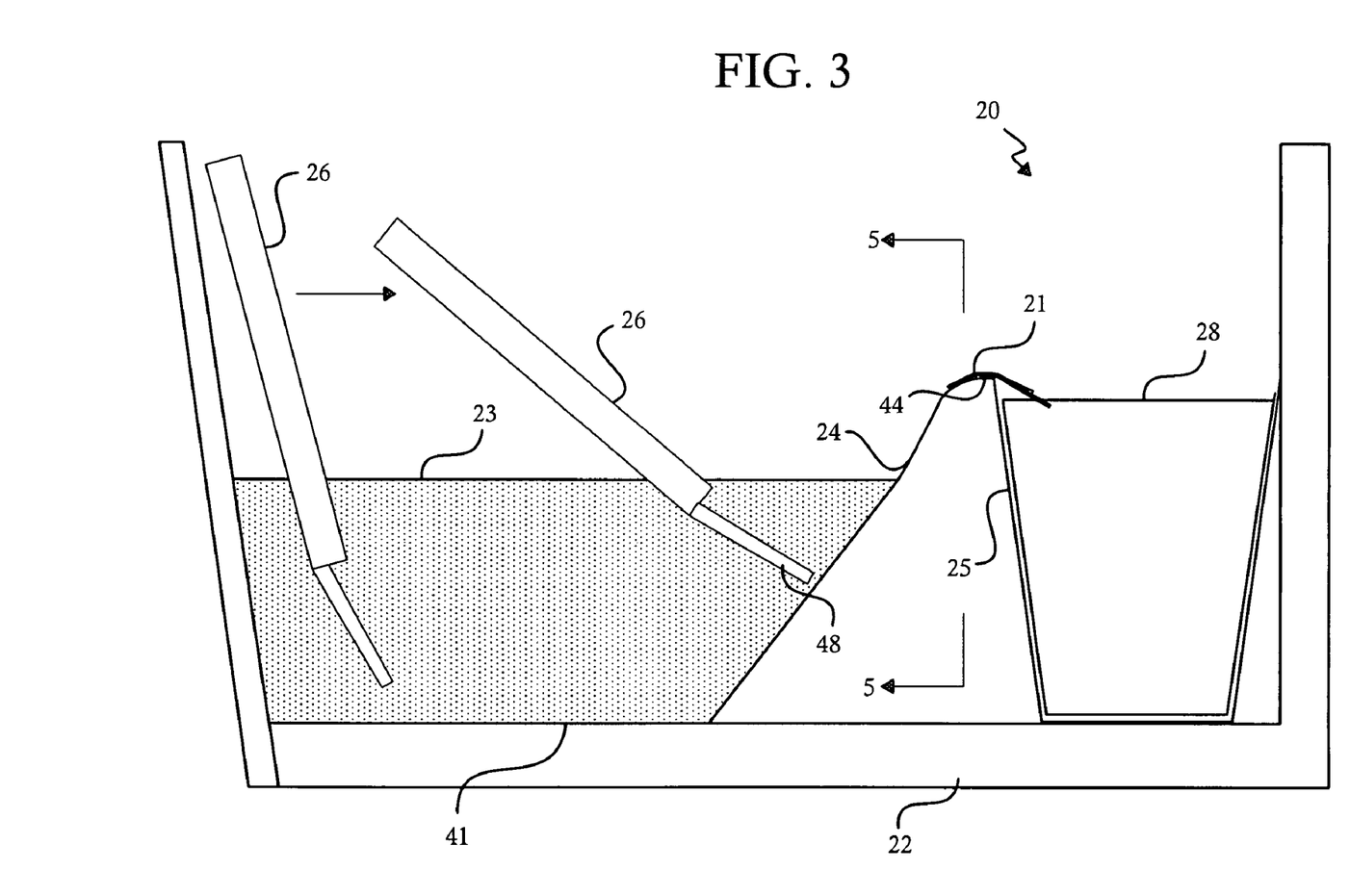
FIG. 3 is a side view schematic of a litter box showing an installed strip assembly and in use according to an embodiment of the present invention.
Figure 4:
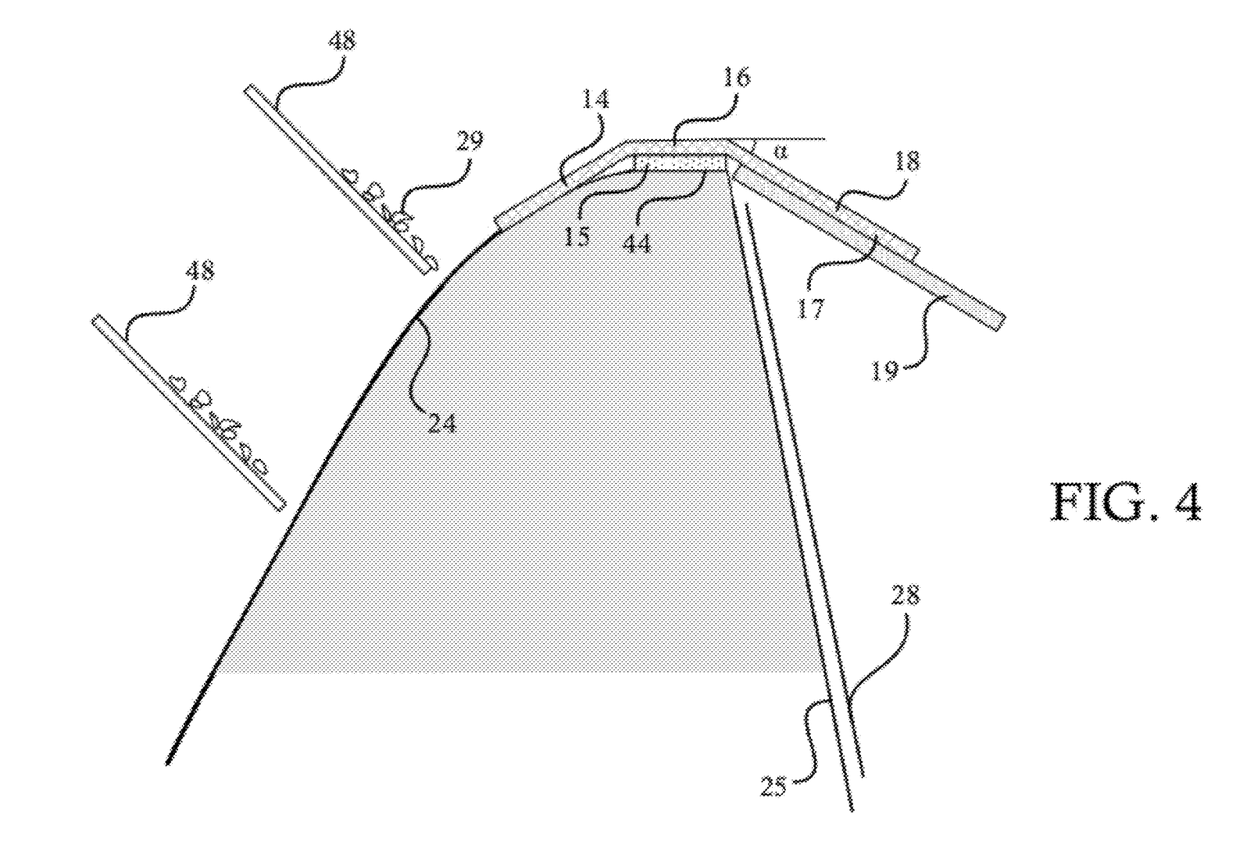
FIG. 4 is a side view schematic of a section of the litter box along lines 5-5 of FIG. 3 according to an embodiment of the present invention.
Figure 5A:
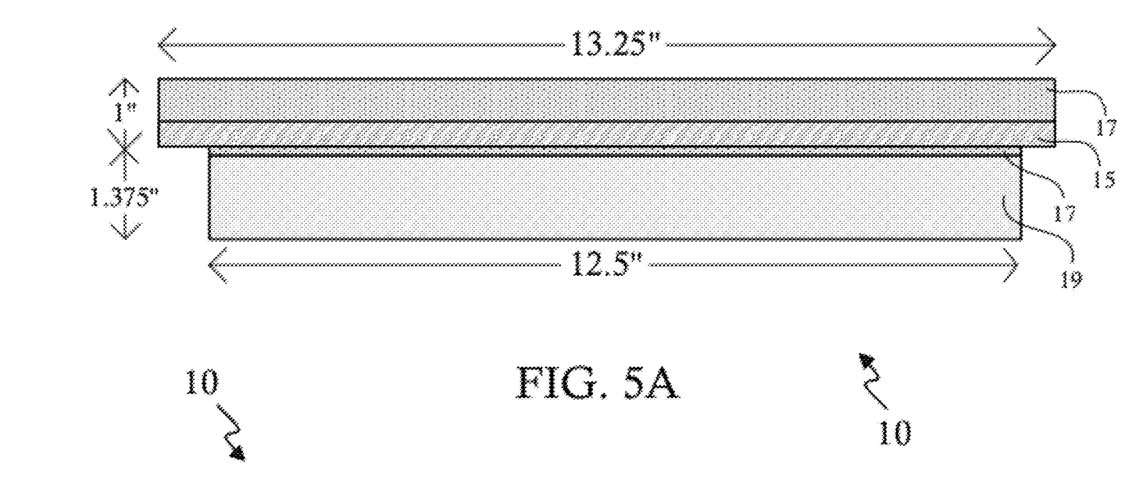
FIG. 5A is a bottom view of the strip assembly according to an embodiment of the present invention.
Figure 5B:
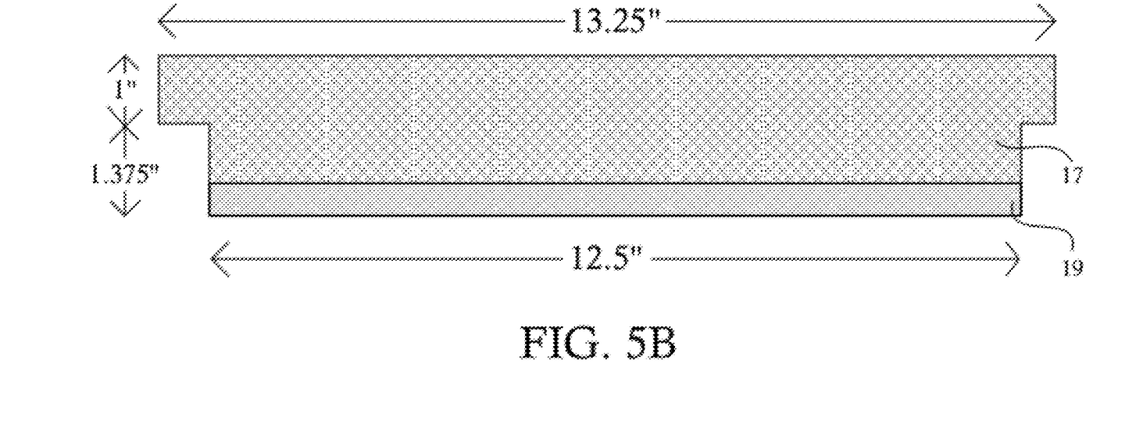
FIG. 5B is a top view of the strip assembly according to an embodiment of the present invention.
Figure 6:
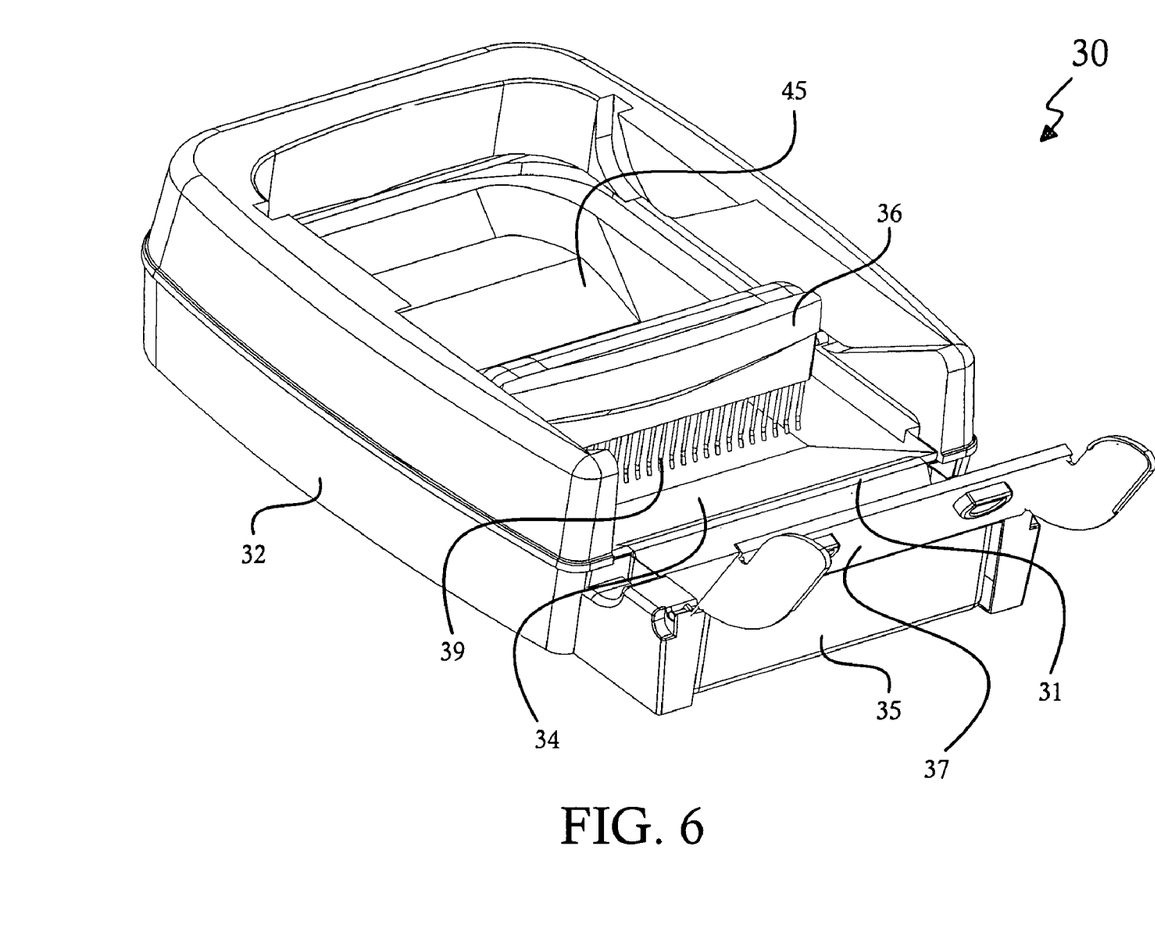
FIG. 6 is a front and side perspective view of a system for covering an interface junction in a litter box according to an embodiment of the present invention.
Figure 7:
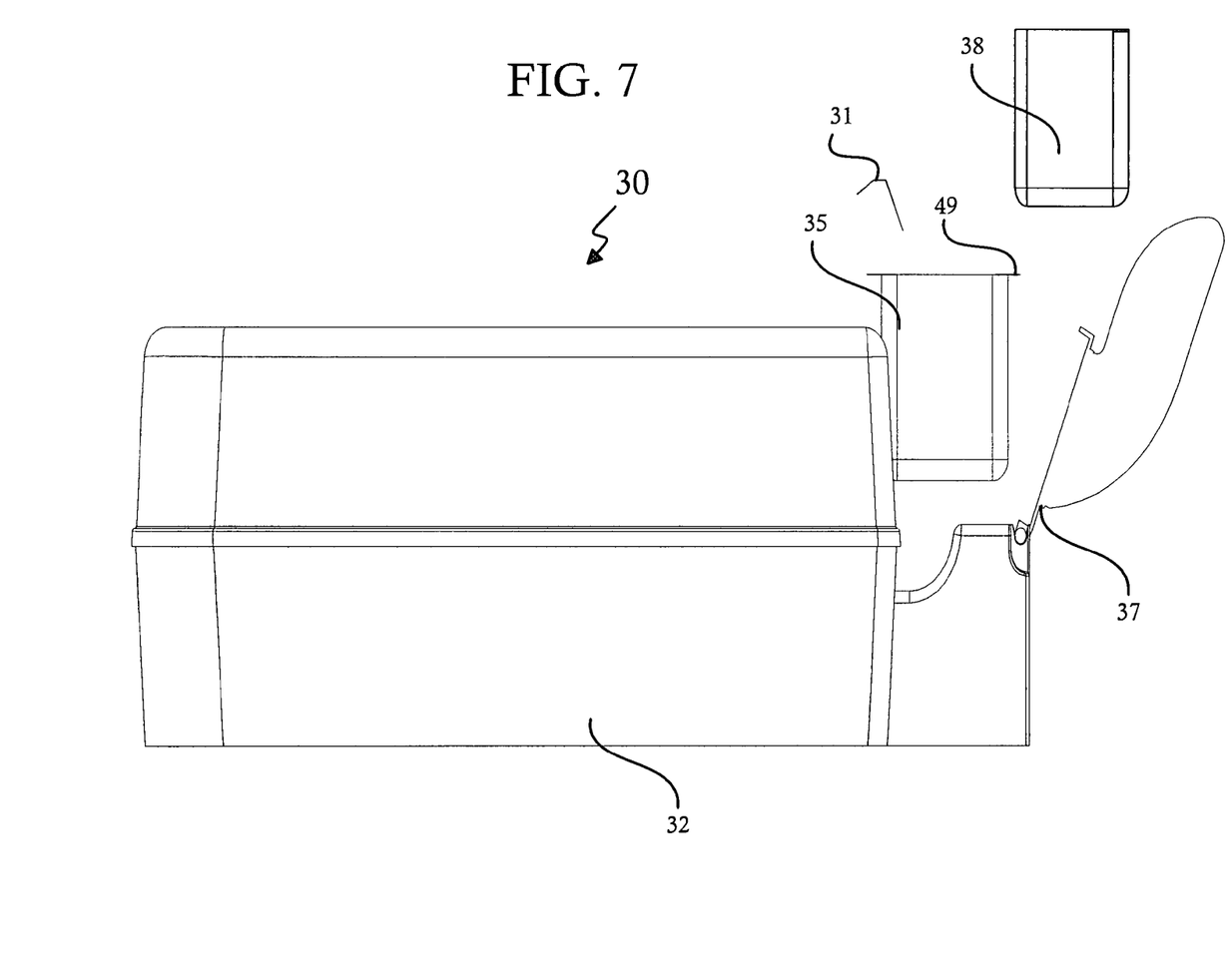
FIG. 7 is a side exploded view of a system for covering an interface junction in a litter box according to an embodiment of the present invention.
Figure 8:
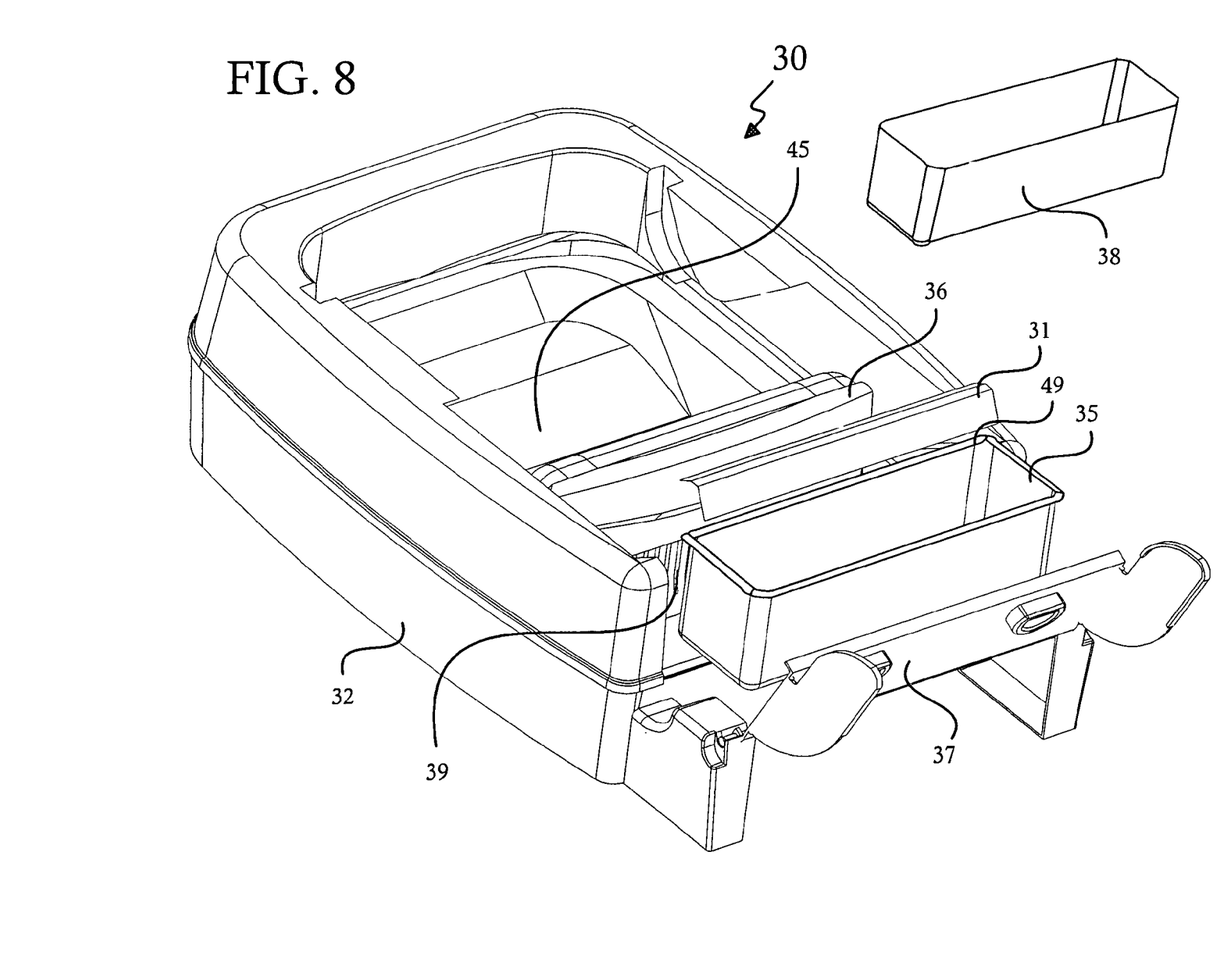
FIG. 8 is a front and side exploded view of a system for covering an interface junction in a litter box according to an embodiment of the present invention.
Figure 9:
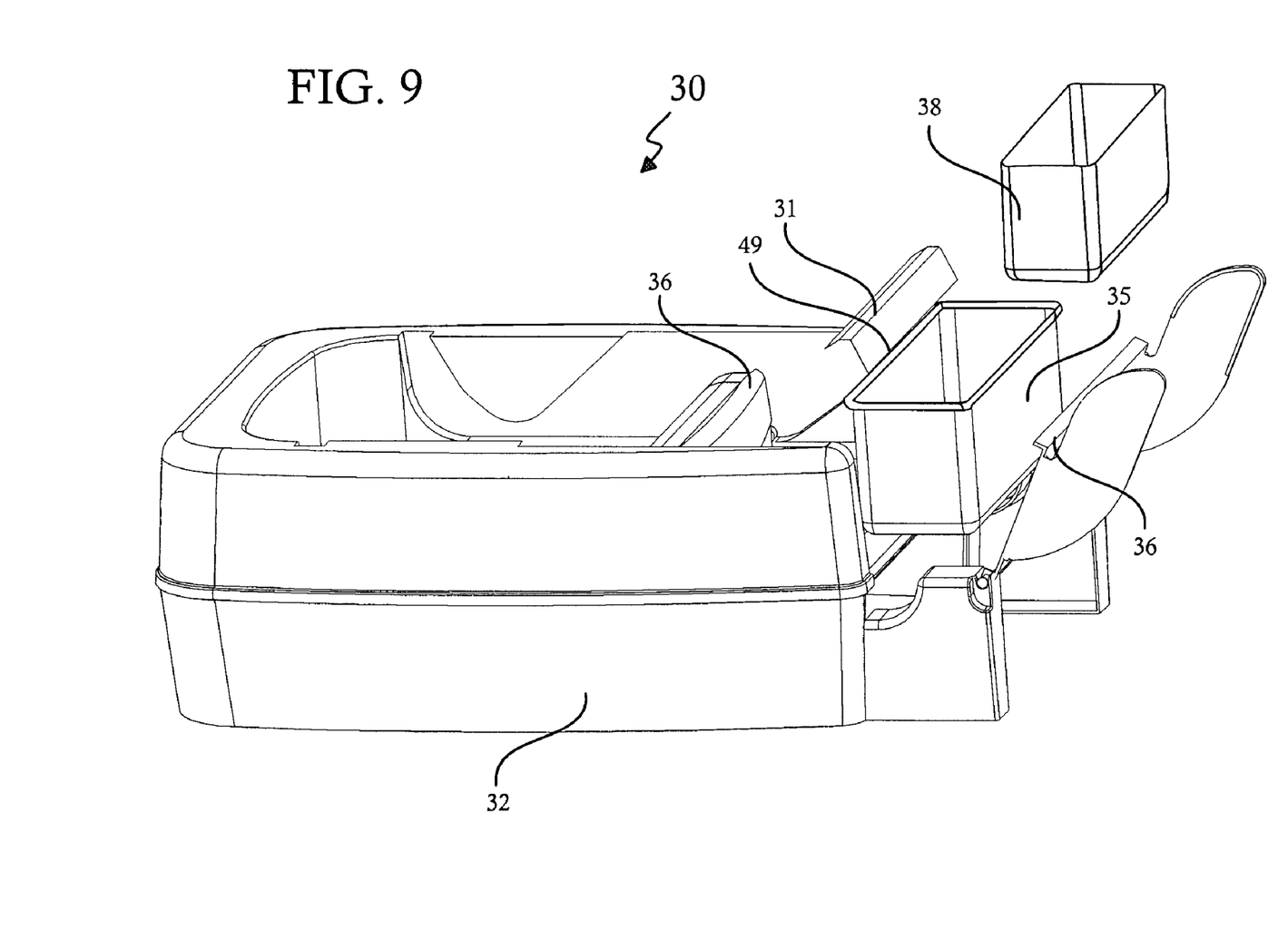
FIG. 9 is another front and side exploded view of a system for covering an interface junction in a litter box according to an embodiment of the present invention.

Referring to FIG. 1, the strip assembly 10 has an incline section 14, a flat section 16, a discharge section 18, and the components of a first strip member 15, the second strip member 19, and the tape 17. The angle between the flat section and the discharge section that results when the strip assembly is attached to a litter box is the bending angle, α. In FIGS. 2, 5A and 5B, the components of the strip assembly: the first strip member 15, the second strip member 19, and tape 17, are shown along with their specific dimensions. In FIG. 3, there is shown a schematic of the system for covering the interface junction in a litter box 20 featuring a litter box frame 22, litter box container 41 containing litter 23, rake assembly 26 having rake tines 48, ramp 24, interface junction 44, strip assembly 21, waste receptacle box 25, and waste receptacle insert 28. FIG. 4 features a section of the system for covering the interface junction in litter box 20 shown in FIG. 3 pointing out the strip assembly components of: incline section 14, flat section 16, discharge section 18, the first strip member 15, the second strip member 19, and the tape 17. Also featured are a rake tine 48 carrying litter clumps 29, ramp 24, interface junction 44, waste receptacle box 25, and waste receptacle insert 28.

FIGS. 6-9 depict the system for covering the interface junction in a litter box highlighting litter box frame 32, litter box container 45, rake assembly 36, rake tines 39, ramp 34, strip assembly 31, waste receptacle box 35, waste receptacle lid 37, and waste receptacle insert 38. The waste receptacle box 35 contains a flange 49 that is part of the interface junction which the strip assembly 31 covers.

I claim:

1. A strip assembly for facilitating the transfer of cat waste from a litter box pan to a waste receptacle, said strip assembly comprising:
   a tape having an adhesive side, a release side, an incline section, a flat section and a discharge section;
   a first strip member having a top side and a bottom side, said top side of the first strip member being attached to a flat section adhesive side of the tape;
   a second strip member, said second strip member being attached to a discharge section adhesive side of said tape in a manner that a portion of the second strip member protrudes outside the discharge section of the tape;
   a flexible hinge between the flat section and the discharge section, said hinge being configured for allowing the discharge section to bend downward into the waste receptacle when carrying the cat waste, said flexible hinge also being configured to rebound to an original position after the waste has been discharged into the waste receptacle; and
   a gap between the first strip member and the second strip member in the strip assembly, said gap being configured for supporting and controlling a bending of the discharge section; said incline section of the tape being attached to a ramp of a cat litter box container, the bottom side of the first strip member being disposed on an interface junction of said cat litter box container, and said discharge section of the strip assembly being bent into a waste receptacle of said cat litter box container at a bending angle relative to the flat section.

2. The strip assembly of claim 1, wherein the incline section has a length of about 13.25 inches and a width of about 0.625 inches.

3. The strip assembly of claim 1, wherein the flat section has a length of about 13.25 inches and a width of about 0.375 inches.

4. The strip assembly of claim 1, wherein the discharge section has a length of about 12.5 inches and a width of about 0.875 inches.

5. The strip assembly of claim 1, wherein the first strip member has a length of about 13.25 inches and a width of about 0.375 inches.

6. The strip assembly of claim 1, wherein the second strip member has a length of about 12.5 inches and a width of about 1.25 inches.

7. The strip assembly of claim 1, wherein the gap between the first strip member and the second strip member in the strip assembly is about 0.125 inches.

8. The strip assembly of claim 1, wherein the second strip member protrudes about 0.5 inches outside the discharge section of the tape.

9. The strip assembly of claim 1, wherein a thickness of the tape ranges from about 0.007 inches to about 0.015 inches.

10. The strip assembly of claim 1, wherein a thickness of the first strip member and the second strip member ranges from about 0.015 inches to about 0.020 inches.

11. The strip assembly of claim 1, wherein said bending angle ranges from about 25 degrees to about 65 degrees.

12. The strip assembly of claim 11, wherein said bending angle is about 45 degrees.

* * * * *